(12) United States Patent
Bash et al.

(10) Patent No.: US 11,226,619 B2
(45) Date of Patent: Jan. 18, 2022

(54) DYNAMICALLY ARMING A SAFETY MECHANISM ON A DELIVERY DRONE

(71) Applicant: Flytrex Aviation Ltd., Tel Aviv (IL)

(72) Inventors: Yariv Bash, Tel Aviv (IL); Amit Regev, Tel Aviv (IL)

(73) Assignee: FLYTREX AVIATION LTD., Tel Aviv (IL)

( * ) Notice: Subject to any disclaimer, the term of this patent is extended or adjusted under 35 U.S.C. 154(b) by 201 days.

(21) Appl. No.: 16/655,730

(22) Filed: Oct. 17, 2019

(65) Prior Publication Data

US 2020/0050188 A1 Feb. 13, 2020

Related U.S. Application Data

(63) Continuation-in-part of application No. 15/649,133, filed on Jul. 13, 2017, now Pat. No. 10,719,086, and
(Continued)

(51) Int. Cl.
*G05D 1/00* (2006.01)
*G05D 3/00* (2006.01)
(Continued)

(52) U.S. Cl.
CPC ......... *G05D 1/0027* (2013.01); *B64C 39/024* (2013.01); *G05D 1/0094* (2013.01);
(Continued)

(58) Field of Classification Search
CPC .. G05D 1/0027; G05D 1/0094; G05D 1/0061; B64C 39/024; B64C 2201/128;
(Continued)

(56) References Cited

U.S. PATENT DOCUMENTS

| 5,799,263 A | 8/1998 | Culbertson |
| 8,330,305 B2 | 12/2012 | Hart et al. |
| (Continued) | | |

FOREIGN PATENT DOCUMENTS

| BR | 112017021483 A2 | 7/2018 |
| CN | 107614375 A | 1/2018 |
| (Continued) | | |

OTHER PUBLICATIONS

The European Search Report for EP Application No. 17837369.2, The European Patent Office, The Hague: dated Jan. 23, 2020.
(Continued)

*Primary Examiner* — Mahmoud S Ismail
(74) *Attorney, Agent, or Firm* — M&B IP Analysts, LLC (57) ABSTRACT

A system and method for dynamically operating a drone safety system of a delivery drone. The method includes: receiving at least one terrain map; receiving a delivery request, wherein the delivery request includes a destination location and a delivery time; analyzing the received at least one terrain map and the delivery request to generate a navigation plan, wherein the navigation plan include a plurality of segments, wherein each of the plurality of segments include at least source coordinates, destination coordinates, an operation instruction to operate a drone safety system in case of failure of a delivery drone; and sending the navigation plan to the delivery drone for execution of the navigation plan at least in case of failure of the delivery drone.

13 Claims, 7 Drawing Sheets

Related U.S. Application Data a continuation-in-part of application No. 16/247,034, filed on Jan. 14, 2019, now Pat. No. 11,029,682, which is a continuation of application No. 15/646,729, filed on Jul. 11, 2017, now Pat. No. 10,191,485, which is a continuation-in-part of application No. 15/447,452, filed on Mar. 2, 2017, now Pat. No. 10,274,949.

(60) Provisional application No. 62/746,596, filed on Oct. 17, 2018, provisional application No. 62/361,505, filed on Jul. 13, 2016, provisional application No. 62/361,711, filed on Jul. 13, 2016, provisional application No. 62/326,787, filed on Apr. 24, 2016.

(51) Int. Cl.
| | | |
|---|---|---|
| *G06F 7/00* | (2006.01) | |
| *G06F 17/00* | (2019.01) | |
| *B64C 39/02* | (2006.01) | |
| *G08G 5/00* | (2006.01) | |
| *G06Q 10/08* | (2012.01) | |

(52) U.S. Cl.
CPC ......... *G08G 5/0013* (2013.01); *G08G 5/0034* (2013.01); *G08G 5/0043* (2013.01); *G08G 5/0069* (2013.01); *G08G 5/0082* (2013.01); *B64C 2201/128* (2013.01); *B64C 2201/146* (2013.01); *G05D 1/0061* (2013.01); *G06Q 10/0832* (2013.01)

(58) Field of Classification Search
CPC ............ B64C 2201/146; G08G 5/0013; G08G 5/0034; G08G 5/0043; G08G 5/0069; G08G 5/0082; G06Q 10/0832
USPC .......................................................... 701/2
See application file for complete search history.

(56) References Cited

U.S. PATENT DOCUMENTS

| | | | |
|---|---|---|---|
| 8,612,136 B2 | 12/2013 | Levine et al. | |
| 8,615,473 B2 | 12/2013 | Spiegel et al. | |
| 8,718,910 B2 | 5/2014 | Guéziec | |
| 8,914,182 B2* | 12/2014 | Casado ................... | G05D 1/104 701/24 |
| 9,082,293 B2 | 7/2015 | Wellman et al. | |
| 9,102,406 B2 | 8/2015 | Stark et al. | |
| 9,221,538 B2 | 12/2015 | Takahashi et al. | |
| 9,368,026 B1 | 6/2016 | Herbach et al. | |
| 9,731,839 B1* | 8/2017 | Beckman ............... | B64C 39/024 |
| 9,852,642 B2 | 12/2017 | Butler et al. | |
| 10,372,142 B2 | 8/2019 | Venturelli | |
| 2006/0161440 A1 | 7/2006 | Nakayama et al. | |
| 2008/0300737 A1* | 12/2008 | Sacle ................... | G08G 5/0039 701/3 |
| 2010/0070124 A1 | 3/2010 | Yeager et al. | |
| 2012/0237028 A1 | 9/2012 | Khazan et al. | |
| 2014/0032034 A1* | 1/2014 | Raptopoulos ........ | G05D 1/0088 701/25 |
| 2014/0254896 A1 | 9/2014 | Zhou et al. | |
| 2015/0073624 A1* | 3/2015 | Takahashi ............. | B64C 39/024 701/2 |
| 2015/0154136 A1* | 6/2015 | Markovic ........... | H04L 12/6418 710/317 |
| 2015/0370251 A1 | 12/2015 | Siegel et al. | |
| 2015/0379874 A1 | 12/2015 | Ubhi et al. | |
| 2016/0018230 A1 | 1/2016 | Neubecker et al. | |
| 2016/0033966 A1 | 2/2016 | Farris et al. | |
| 2016/0039300 A1 | 2/2016 | Wang et al. | |
| 2016/0068264 A1* | 3/2016 | Ganesh ............. | G06Q 30/0261 701/2 |
| 2016/0070264 A1 | 3/2016 | Hu et al. | |
| 2016/0125735 A1 | 5/2016 | Tuukkanen | |
| 2016/0189549 A1 | 6/2016 | Marcus | |
| 2016/0274578 A1 | 9/2016 | Arwine | |
| 2017/0011340 A1* | 1/2017 | Gabbai ............ | G06Q 10/08355 |
| 2017/0090484 A1* | 3/2017 | Obaidi ................... | B64D 47/08 |
| 2017/0225792 A1* | 8/2017 | Wang .................... | B64C 39/024 |
| 2017/0235018 A1* | 8/2017 | Foster .................... | B64D 17/80 702/5 |
| 2017/0316621 A1 | 11/2017 | Jefferies et al. | |
| 2018/0044000 A1 | 2/2018 | Venturelli et al. | |
| 2018/0047295 A1* | 2/2018 | Ricci ...................... | G05D 1/104 |
| 2018/0188747 A1 | 7/2018 | Venturelli | |

FOREIGN PATENT DOCUMENTS

| | | |
|---|---|---|
| CN | 107924190 A | 4/2018 |
| CN | 109956041 A | 7/2019 |
| EP | 2767962 A1 | 8/2014 |
| EP | 3280638 A1 | 2/2018 |
| EP | 3314344 A1 | 5/2018 |
| EP | 3280638 A4 | 12/2018 |
| EP | 3314344 A4 | 2/2019 |
| IN | 201727035253 | 12/2017 |
| MX | 2017012941 A | 11/2018 |
| RU | 2217797 C2 | 11/2003 |
| WO | 2015061008 A1 | 4/2015 |
| WO | 2015160672 A1 | 10/2015 |
| WO | 2016164416 A1 | 10/2016 |
| WO | 2016210156 A1 | 12/2016 |

OTHER PUBLICATIONS

The International Search Report and the Written Opinion for PCT/US2017/041514, ISA/RU, Moscow, Russia, dated Apr. 12, 2018.
Notice of Deficiencies for European Patent Application No. 17837369.2, dated Sep. 3, 2020, EPO, Munich, Germany.
Notice of Deficiencies for European Patent Application No. 17837369.2, dated Jan. 15, 2021, EPO, Munich, Germany.
The Supplementary European Search Report and Search Opinion for EP Application No. 17837369.2, Munich, Germany, dated Jan. 16, 2020.
The Third European Office Action for European Patent Application No. 17837369.2 dated May 27, 2021, EPO, Munich, Germany.
The Fourth European Office Action for European Patent Application No. 17837369.2, dated Oct. 8, 2021, EPO, Munich, Germany.

* cited by examiner

DYNAMICALLY ARMING A SAFETY MECHANISM ON A DELIVERY DRONE

CROSS-REFERENCE TO RELATED APPLICATIONS

This application claims the benefit of U.S. Provisional Application No. 62/746,596 filed on Oct. 17, 2018. This application is also a continuation-in-part (CIP) of:
a. U.S. patent application Ser. No. 16/247,034 filed on Jan. 14, 2019, now pending. The Ser. No. 16/247,034 application is a continuation of U.S. patent application Ser. No. 15/646,729 filed on Jul. 11, 2017, now U.S. Pat. No. 10,191,485, which claims the benefit of U.S. Provisional Application No. 62/361,711 filed on Jul. 13, 2016. The Ser. No. 15/646,729 application is also a continuation-in-part of U.S. patent application Ser. No. 15/447,452 filed on Mar. 2, 2017, now U.S. Pat. No. 10,274,949, which claims the benefit of U.S. Provisional Application No. 62/326,787 filed on Apr. 24, 2016; and
b. U.S. patent application Ser. No. 15/649,133 filed on Jul. 13, 2017, now pending; which claims the benefit of U.S. Provisional Application No. 62/361,505 filed on Jul. 13, 2016.

The contents of the above-referenced applications are hereby incorporated by reference.

TECHNICAL FIELD

The present disclosure generally relates to unmanned aerial vehicles and particularly to navigation termination modules of the same.

BACKGROUND

Unmanned vehicles (UVs), known colloquially as drones, are seeing increased industry use as improvements in fields such as artificial intelligence, battery life, and computation are made. As an example, companies such as Amazon® are increasingly using UVs such as drones to deliver packages. As a result, some companies will likely begin to utilize hundreds or thousands of UVs at once to provide services.

Control over drones may be complicated, due in part to a need to balance autonomous control with manual control. One particular use for drones in fleet control of UVs simultaneously, where control becomes exponentially more complicated. Manual control of each and every drone may be undesirable due to, e.g., excessive labor costs, human error, and the like.

Many solutions for automated navigation of drones utilize on-board computations, thereby requiring more expensive hardware on-board each drone for performing computations. These costs are exacerbated when multiple drone (i.e., a fleet) are controlled. Further, the computations needed to successfully navigate to target locations often become increasingly complex as a UV approaches the target. Specifically, as a UV approaches a target, travel by the UV requires more precise movements to, e.g., arrive at the correct geographical coordinates, avoid near-the-ground obstacles, land safely, and the like.

As a result of the difficulty in precisely navigating when approaching a landing site, existing drone solutions often face challenges arriving at particular sub-locations of a landing location. For example, many existing UV solutions cannot successfully pilot the UV to, e.g., a particular room or floor of a building. This inability to pilot to particular sub-locations can result in meddling with the UV, thereby frustrating its intended goal. As an example, when a drone delivers a package to an apartment complex, the drone may land in a general zone outside of the complex, which leaves the drone vulnerable to theft by a person other than the intended recipient.

Additionally, some existing solutions for landing drones require the landing site to have a pre-known landing mat or other guide marker to successfully land. Such solutions can face challenges when the guide marker is obfuscated (e.g., if a visual guide marker is visually blocked or if signals from a guide marker are blocked or otherwise subject to interference). Further, if the landing site does not have a suitable guide marker, the drone may be unable to successfully navigate to the landing site.

Further, some existing solutions provide automated detection systems utilized to avoid and navigate around obstacles. Such solutions may still face challenges when obstacles are small or otherwise difficult for sensors of the UV to detect.

Drones typically require significant infrastructure to implement at larger scales (e.g., for a company). Thus, although drones and other unmanned vehicles may provide significant advantages such as reduced cost and increased shipping speed, some third parties may be unable to take advantage of drones. However, offering complete access to UVs by third parties decreases security of drone operations and can result in malicious use of those drones.

In addition, due to the technology complication in controlling drones and providing scalable infrastructure, regulatory authorities have been slow to adopt these technologies for civilian use due to safety and security concerns. One such concern is how drone malfunctions are handled. Occurrence of such malfunctions whilst the drone is over civilian population should especially be avoided.

While parachute systems can ensure a lesser impact of a falling drone, simple solutions often lack navigability and may therefore result in the drone ending up in unintended places. For example, deploying a parachute over civilian areas may not prevent a heavy drone from falling in places where people may be.

It would therefore be advantageous to provide a method for increasing civilian safety for drone usage.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for dynamically operating a drone safety system of a delivery drone. The method comprises: receiving at least one terrain map; receiving a delivery request, wherein the delivery request includes a destination location and a delivery time; analyzing the received at least one terrain map and the delivery request to generate a navigation plan, wherein the navigation plan include a plurality of segments, wherein each of the plurality of segments include at least source coordinates, destination coordinates, an operation instruction to operate a drone safety system in case of failure of a delivery drone; and sending the navigation plan to the delivery drone for execution of the navigation plan at least in case of failure of the delivery drone.

Certain embodiments disclosed herein also include a non-transitory computer readable medium having stored thereon causing a processing circuitry to execute a process, the process comprising: receiving at least one terrain map; receiving a delivery request, wherein the delivery request includes a destination location and a delivery time; analyzing the received at least one terrain map and the delivery request to generate a navigation plan, wherein the navigation plan include a plurality of segments, wherein each of the plurality of segments include at least source coordinates, destination coordinates, an operation instruction to operate a drone safety system in case of failure of a delivery drone; and sending the navigation plan to the delivery drone for execution of the navigation plan at least in case of failure of the delivery drone.

Certain embodiments disclosed herein also include a system for dynamically operating a drone safety system of a delivery drone. The system comprises: a processing circuitry; and a memory, the memory containing instructions that, when executed by the processing circuitry, configure the system to: receive at least one terrain map; receive a delivery request, wherein the delivery request includes a destination location and a delivery time; analyze the received at least one terrain map and the delivery request to generate a navigation plan, wherein the navigation plan include a plurality of segments, wherein each of the plurality of segments include at least source coordinates, destination coordinates, an operation instruction to operate a drone safety system in case of failure of a delivery drone; and send the navigation plan to the delivery drone for execution of the navigation plan at least in case of failure of the delivery drone.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various example embodiments disclosed herein include techniques for dynamically arming and disarming safety deployment measures (such as a parachute) based on the current landscape that drone is flying over. By way of example, when a drone malfunctions over a body of water, the disclosed techniques would allow the drone to fall in a lake, rather than activate a parachute which could cause the drone to drift towards a nearby residential area. In certain embodiments, other parameters, such as time of the day or day of the month are considered when determining whether to disarm the drone.

The disclosed techniques would allow for increased civilian safety when utilizing drone delivery systems, parachutes may be used to ensure that a heavy drone does not fall in places where people may be. However, not all civilian areas are identical; some may be densely populated, such as highways, residential areas, and so on, while others, such as forests, parks, and lakes, are not. Further, population density may change as a function of time of day, time of month, year, and so on. For example, a school is populated during certain hours, and typically not at all on weekends. While parachute systems can ensure reduced impact of a falling drone, simple solutions often lack navigability and may therefore result in the drone ending up in unintended places.

Figure 1A:
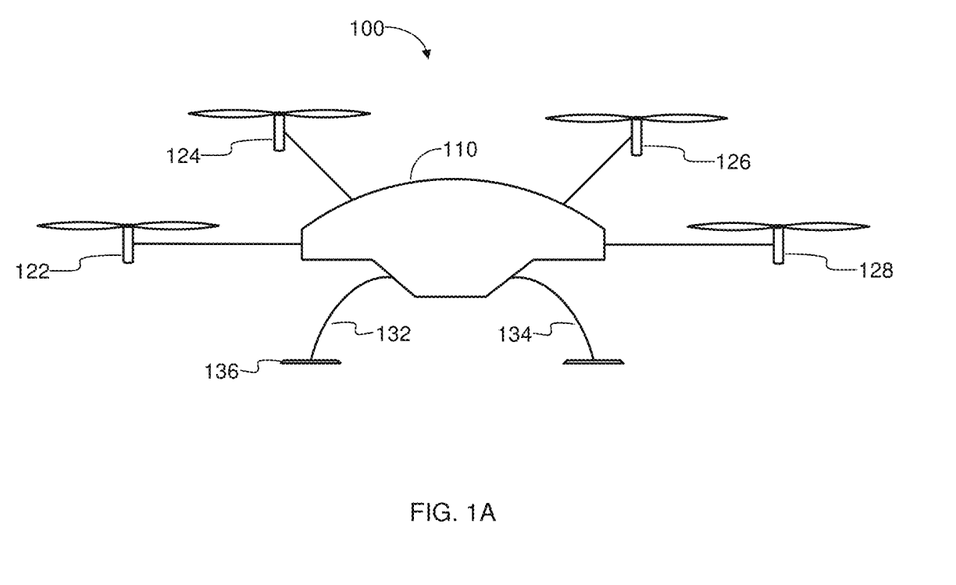
FIG. 1A is a schematic illustration of a delivery drone according to an embodiment.

FIG. 1A is an example schematic illustration of a delivery drone 100 according to an embodiment. The delivery drone 100 (also referred to as an unmanned aerial vehicle (UAV)) includes a body 110, for housing therein a controller (discussed in more detail with respect to FIG. 2), a navigation termination module (NTM) 200, and may be configured for coupling with a payload.

Figure 4:
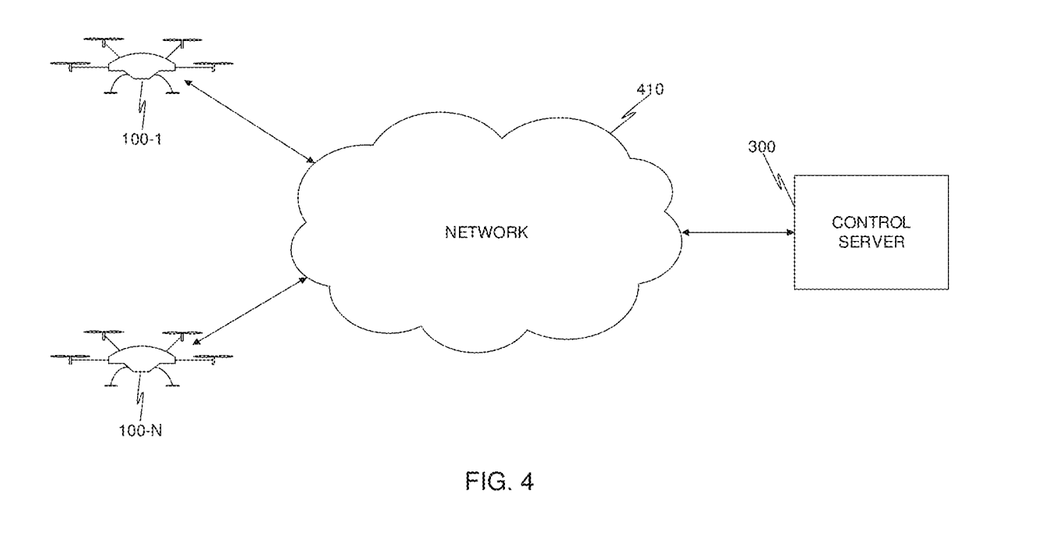
FIG. 4 is a schematic illustration of a control server controlling multiple delivery drones over a network, implemented in accordance with an embodiment.

The controller may be connected to a communication circuit, for communicating with a control server, such as control server 300, over a network (discussed in more detail in FIG. 4). The body 110 is coupled with a plurality of rotors: a first rotor 122, a second rotor 124, a third rotor 126, and a fourth rotor 128.

Typically, one pair of rotors, for example the first rotor 122 and the third rotor 126, will turn clockwise, while a second pair of rotors, for example, the second rotor 14 and the fourth rotor 128, will turn counter-clockwise. Typically, the rotors have a fixed pitch, and height, yaw, pitch, and roll are adjusted by applying varying power to each rotor as the situation requires. In some embodiments, the delivery drone 100 may further include a pair of landing skids 132 and 134. In certain embodiments, the landing skids may be equipped with dampers, such as damper 136. Dampers assist in shock absorption for a landing delivery drone, allowing protection of a delivery drone's payload, and protection of, for example, the controller.

Figure 1B:
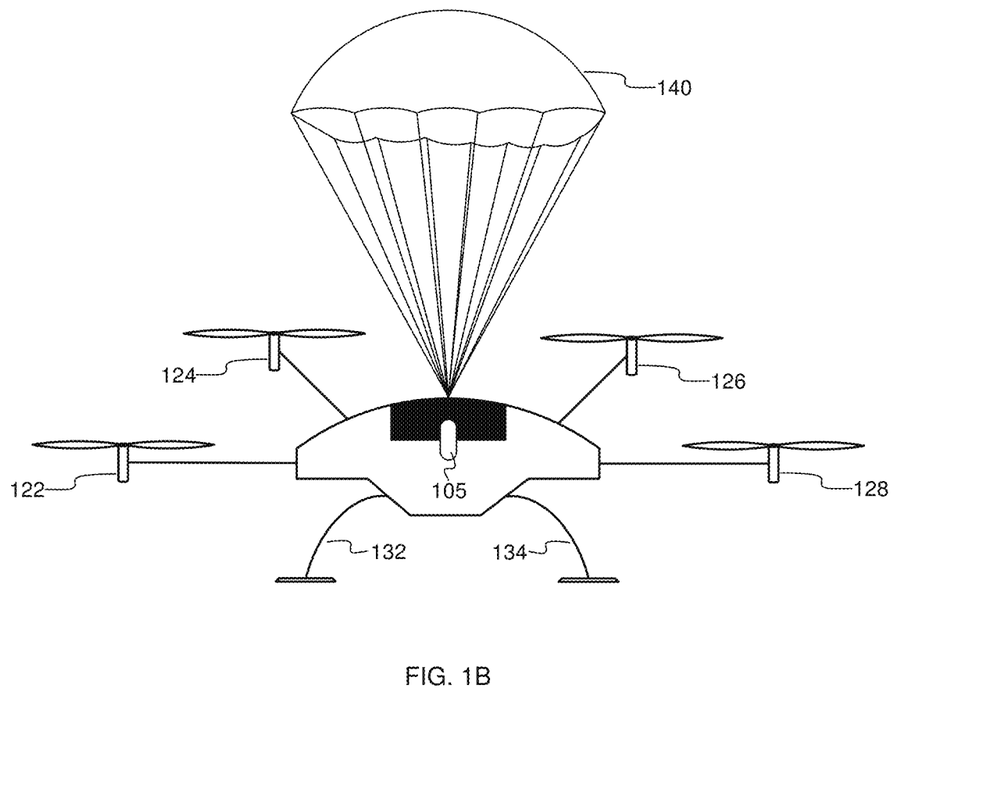
FIG. 1B is a schematic illustration of a delivery drone coupled with a navigation termination module (NTM), implemented in accordance with an embodiment.

FIG. 1B is an example schematic illustration of a delivery drone 100 connected with an NTM 200, implemented according to an embodiment. Certain delivery drones may include a terminal for coupling external devices, such as sensors, cameras, payloads, and so on. The NTM 200 may be physically connected with the delivery drone 100 through such a terminal, for example, and, in some embodiments, be further fastened with a latch 105 to the delivery drone's body 110. In certain embodiments, the NTM may be connected to a bus of the delivery drone to further receive signals and/or flight information from one or more sensors of the delivery drone. The NTM is configured to receive data from one or more inputs and to determine when to initiate a navigation termination protocol, which includes cutting power to the UV's propelling system and deploying a protection device, such as a parachute 140.

Figure 2:
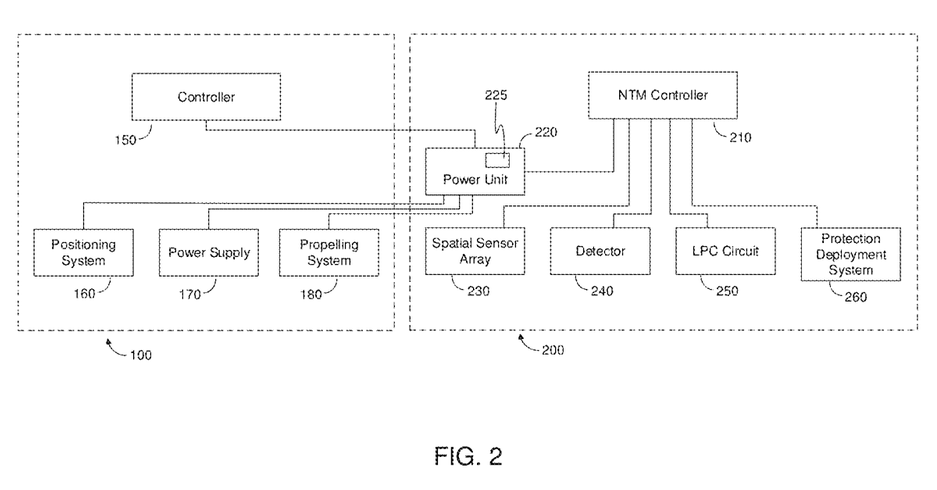
FIG. 2 is a schematic illustration of a navigation termination module (NTM) coupled with a delivery drone system implemented according to an embodiment.

FIG. 2 is an example schematic illustrating a navigation termination module (NTM) 200 connected with a delivery drone 100 according to embodiment. A delivery drone 100 is described in more detail with respect to FIG. 1A.

In this embodiment, the delivery drone 100 includes a controller 150 configured to control the various functions of the delivery drone. The controller 150 may include at least one processing element. In an embodiment, the processing element may be, or may be a component of, a larger processing unit implemented with one or more processors. The one or more processors may be implemented with any combination of general-purpose microprocessors, microcontrollers, digital signal processors (DSPs), field programmable gate arrays (FPGAs), programmable logic devices (PLDs), for example, a central processing unit (CPU), controllers, state machines, gated logic, discrete hardware components, dedicated hardware, finite state machines, or any other suitable entities that can perform calculations or other manipulations of information.

The processing element may be coupled via a bus to a memory. The memory may include a memory portion that contains instructions that when executed by the processing element performing the method described in more detail herein. The memory may be further used as a working scratch pad for the processing element, a temporary storage, and for other functions, as the case may be. The memory may be a volatile memory such as, but not limited to random access memory (RAM), or non-volatile memory (NVM), such as, but not limited to, Flash memory.

The processing element and/or the memory may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein. The controller 150 is typically coupled with a positioning system 160, a power supply 170, and a propelling system 180.

A positioning system 160 may be, for example, a GPS module, which is operative for determining GPS coordinates of the drone. A power supply 170 may include energy storage, such as a rechargeable battery. The power supply 170 may include, in some embodiments, a photovoltaic array coupled with an energy storage device. A propelling system 180 is operative for propelling the UV. The propelling system 180 may include, for example, one or more motors, an engine, and the like. In this exemplary embodiment, the controller 150 is coupled with a power unit 220 of an NTM 200. The power unit 220 includes a circuit breaker 225 for cutting power from the power supply 170 to the propelling system 180.

The power unit 220 may be further operative for supplying power to the NTM 200. The NTM controller 210 may include at least one processing element, for example, a central processing unit (CPU). In an embodiment, the processing element may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing element may be coupled via a bus to a memory. The memory may include a memory portion that contains instructions that when executed by the processing element performs the method described in more detail herein. The memory may further be used as a working scratch pad for the processing element, a temporary storage, and for other functions, as the case may be. The memory may be a volatile memory such as, but not limited to, random access memory (RAM), or non-volatile memory (NVM), such as, but not limited to, Flash memory. The processing element and/or the memory may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The instructions, when executed by the one or more processors, cause the processing system to perform the various functions described in further detail herein. The NTM 200 may further include a spatial sensor array 230. The spatial sensor array 230 may include, in an embodiment, one or more accelerometers. The spatial sensor array 230 may be used to determine if the drone is operating normally. For example, the spatial array may detect a sudden change in direction which is not according to an uploaded navigation plan, or detect a wobbling movement (for example cause by a motor malfunction), both examples indicating that the drone is not operating within normal parameters.

The NTM 200 may further include a detector 240, such as a RADAR system, an optical sensor, or combinations thereof. The detector 240 may be used to detect obstacles in the vicinity of the drone, such as trees, buildings, other drones, etc. An optical sensor may be used to generate an input for a computer vision detection system (not shown) which may be used to detect and identify obstacles in the drone's navigation path. The NTM 200 includes a communication circuit, such as a low power communication (LPC) circuit 250.

In an embodiment, the LPC 250 may further use an authentication system (not shown) for authenticating received instructions. In some embodiments, instructions may include a sequence, for example of bits, which is unique to one specific delivery drone. The received instructions may be sent from an authorized node, such as a server or user device, for example. The NTM 200 also includes a protection deployment system (PDS) 260. Upon initiating a navigation termination, the NTM controller 210 configures the circuit breaker 225 of the power unit 220 to break the circuit between the power supply 170 and the propelling system 180.

As the delivery drone may be a danger to itself and to other property and/or humans, the NTM controller 210 initiates the protection deployment system (PDS) 260. The PDS 260 includes, in an embodiment, a parachute capable of, for example, decreasing the descent rate of a delivery drone. In some embodiments, the PDS 260 may include one or more airbags which absorb the energy of the drone upon impact. In an embodiment, the NTM controller 210 may configure the PDS 260 to be armed or disarmed. In a disarmed state the PDS 260 will not deploy upon navigation termination. In some embodiments, the NTM 200 may be integrated as part of the delivery drone 100, in such embodiments the controller 150 and the NTM controller 210 may be a single controller unit.

Figure 3:
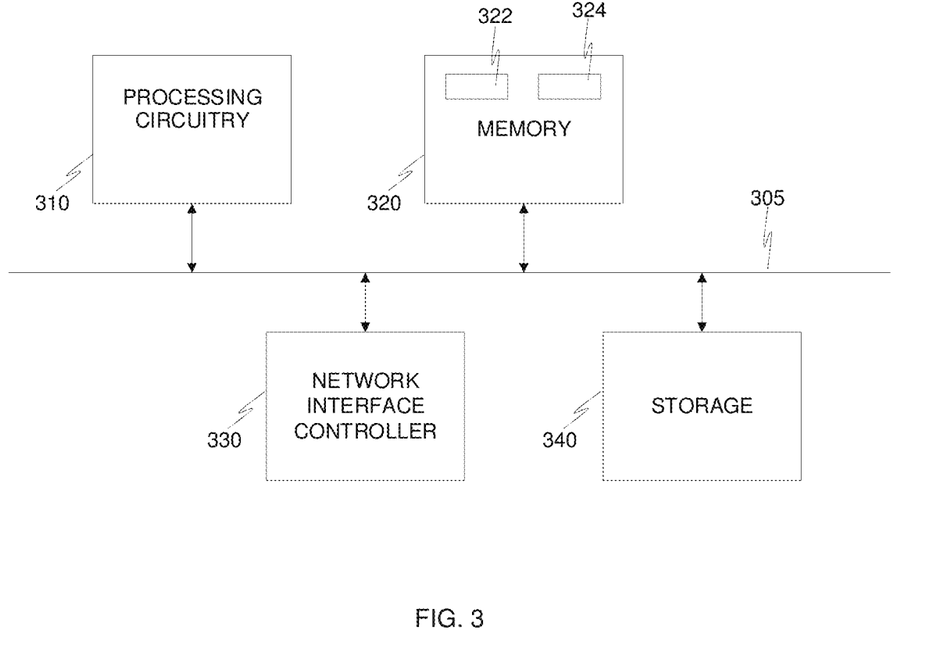
FIG. 3 is a schematic illustration of a delivery drone control server implemented according to an embodiment.

FIG. 3 is an example block diagram of a delivery drone control server 300 implemented according to an embodiment. The server 300 includes a processing circuitry 310 coupled to a memory 320, and a network interface controller (NIC) 330, and storage 340. In an embodiment, the components of the control server 300 may be communicatively connected via a bus 305 (e.g., a PCIe bus).

The processing circuitry 310 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 320 may include a memory portion 322 that contains instructions that when executed by the processing circuitry 310 performs the method described in more detail herein. The memory 320 may be further used as a working scratch pad for the processing circuitry 310, a temporary storage, and others, as the case may be. The memory 320 may be a volatile memory such as, but not limited to random access memory (RAM), or non-volatile memory (NVM), such as, but not limited to, Flash memory. Memory 320 may further include memory portions 324 containing navigation instructions for one or more delivery drones, the navigation plans including a takeoff point (i.e. coordinates of a takeoff point) and delivery location (i.e. coordinates of a delivery location).

The NIC 330 is operative for connecting the delivery drone control server 300 to a network, over which the server 300 can communicate (i.e. send) instructions to one or more delivery drones, such as a delivery drone 100 of FIG. 1A. In an embodiment, the control server 300 is configured to generate navigation plans for the delivery drone to execute, the navigation plan including at least origin coordinates, and destination coordinates.

The storage 340 may be used for the purpose of holding a copy of the method executed in accordance with the disclosed technique. The processing element 310 and/or the memory 320 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

FIG. 4 is an example schematic illustration of a control server 300 controlling a plurality of delivery drones over a network according to an embodiment. A control server 300 is communicatively coupled with a network 410. In an embodiment, the network 410 may be configured to provide connectivity of various sorts, as may be necessary, including, but not limited to, wired and/or wireless connectivity, including, for example, local area network (LAN), wide area network (WAN), metro area network (MAN), worldwide web (WWW), Internet, and any combination thereof, as well as cellular connectivity.

The network 410 further provides wireless communication for a plurality of delivery drones 100-1 through 100-N, where 'N' is an integer having a value of '2' or greater. The control server 300 may send over the network 410 to each of the delivery drones 100 a navigation plan, and other instructions, as needed. For example, the control server 300 may instruct a drone 100 to release a package or payload, to abort a navigation plan, to arm or disarm a PDS, and the like. In some embodiments, the delivery drones 100 and the control server 300 may include an authentication module to verify instructions received by a delivery drone 100 from the control server 300.

Figure 5:
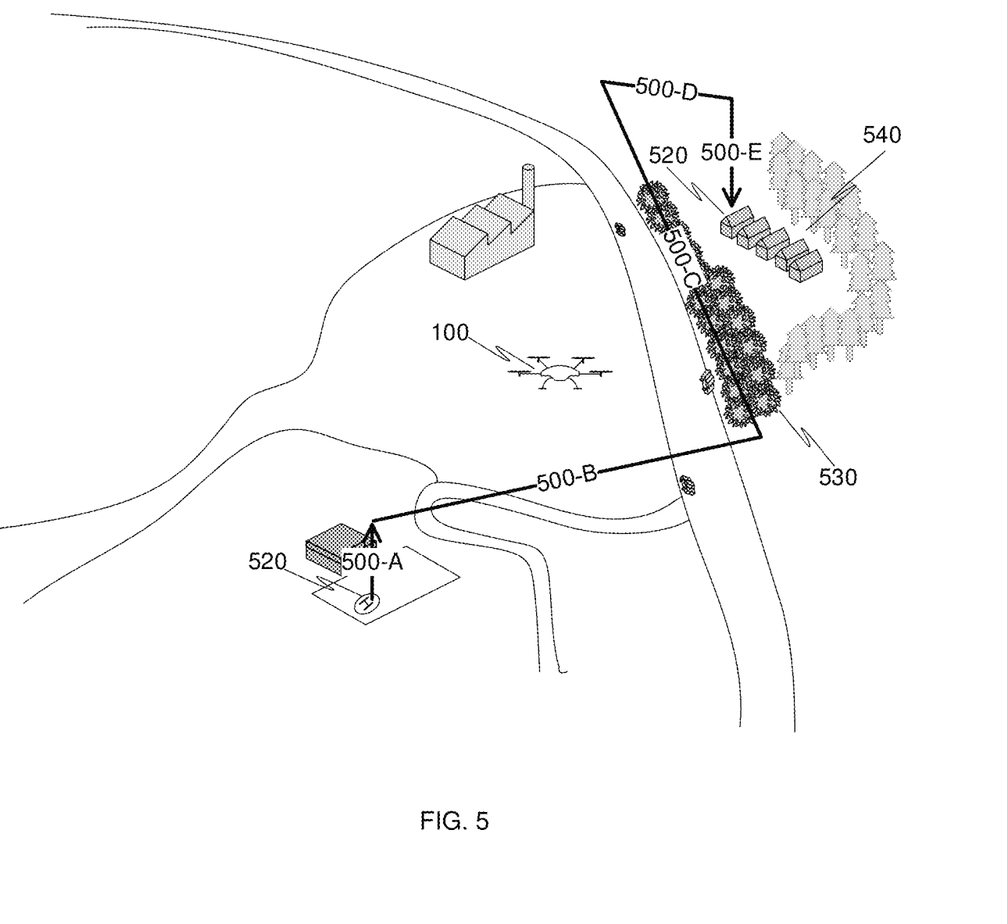
FIG. 5 is a schematic illustration of a delivery drone navigating according to a flight plan received from a control server according to an embodiment.

FIG. 5 is an example schematic illustration of a delivery drone navigating according to a flight plan received from a control server according to an embodiment. A delivery drone 100 is configured by a control server (e.g., control server 300 of FIG. 3) to take off from an origin point 520 in a navigation plan comprising five segments: 500-A, 500-B, 500-C, 500-D, and 500-E. A segment includes a first point (e.g. origin), a second point (e.g. destination), and optionally an elevation at which to fly in between these points.

For consecutive segments, the destination of a first segment is the origin of a second segment. In an embodiment, the navigation of each segment may further include arming or disarming of the PDS of the drone (e.g., PDS 260). For example, the control server may configure the delivery drone 100 to arm the PDS in segments 500-A, 500-B, and 500-E, and disarm the PDS for segments 500-C and 500-D. This may be advantageous because of the terrain below each segment. In this example, segment 500-C is above trees 530. If the delivery drone 100 initiated a parachute deployment in case of malfunction, the drone 100 may drift towards the residential area 540.

Therefore, it may be safer that the drone 100 be allowed to crash without the aid of a parachute into the trees 530, rather than risk drifting into the residential area 540 where contact with people is much more likely. Likewise, segment 500-D is above an open space, whereas if a parachute is deployed the delivery drone 100 may land in any direction the wind may be blowing.

According to the disclosed embodiments, the control server may configure navigation segments differently at different times. For example, while it may not be acceptable to crash in a school on a weekday, during the weekend the school is unlikely to be populated and it may therefore be safer to crash above such a location, rather than drift with a parachute into the surrounding neighborhood. As another example, it may be safer to crash in an open stadium when an event has taken place, when the navigation decision is made. In some embodiments, the control server may configure the delivery drone 100 to disarm a part of the PDS, but not all of it. For example, the PDS may disarm a parachute, but retain an airbag. In other embodiments, segments such as segment B may be broken into sub-segments to distinguish between sub-segments where the PDS should be armed or disarmed.

Figure 6:
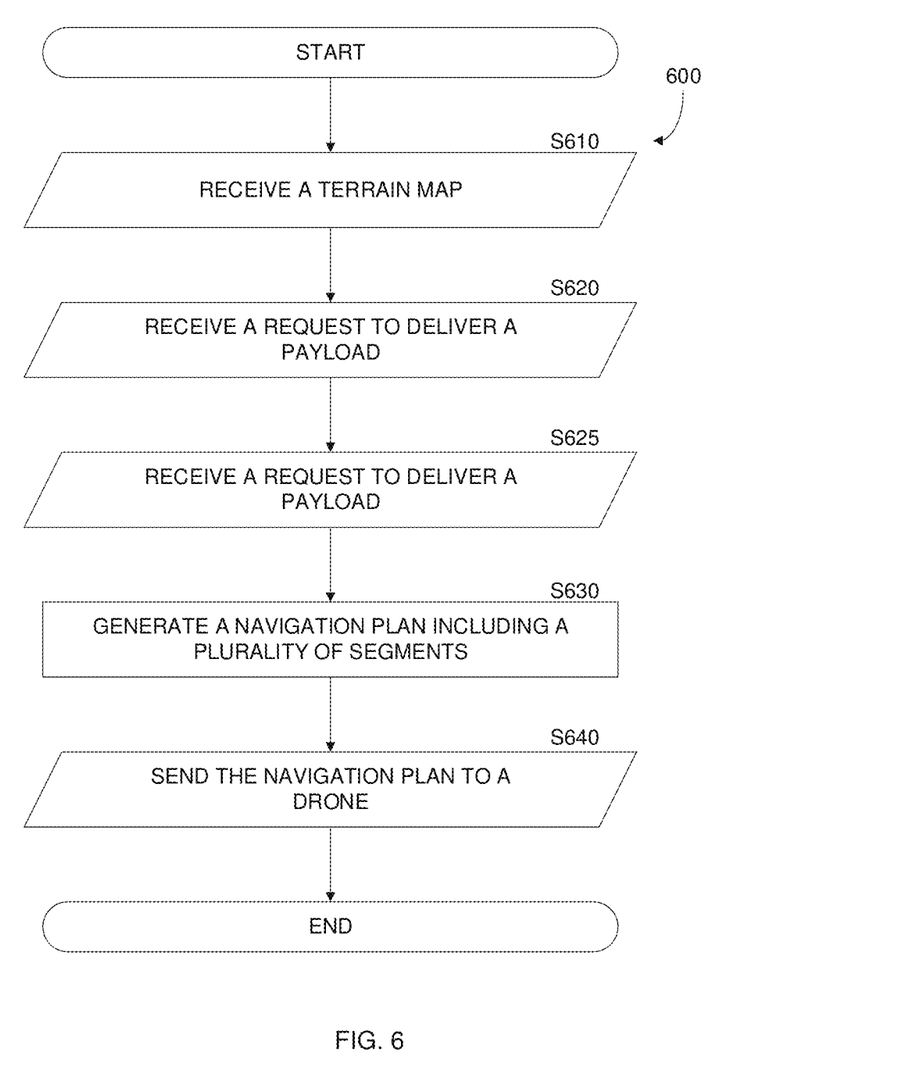
FIG. 6 is a flowchart of a computerized method for arming and disarming a parachute of a delivery drone according to an embodiment.

FIG. 6 is an example flowchart 600 of a computerized method for dynamically arming and disarming a PDS of a delivery drone according to an embodiment. The method may be performed by a control server, such as the control server 300.

At S610, at least one terrain map is received. The terrain map defines the terrain in a certain location (e.g., a state) in which the delivery drone is configured to fly. The received terrain map shows natural and man-made features (structures) and designates prohibited flight zones in locations, such as airports, power plants, military bases, stadiums, and so on. In an embodiment, the terrain map further includes zoning areas, such that each coordinate on the terrain map corresponds to a certain zone. A zone may be residential, commercial, and the like. In some embodiments, the terrain map includes coordinates corresponding to bodies of water (lakes, rivers, etc.), natural areas such as forests, agricultural areas, and the like. The control server may be configured such that zones and/or areas are associated with arming or disarming a PDS.

At S620, a delivery request to deliver a payload by the drone to a destination is received. The delivery request includes destination coordinates and optionally delivery time (day and time of the day). The coordinates can be transferred to a positioning system of the delivery drone.

At an optional S625, a plurality of environmental parameters may be received from external sources (not shown). The environmental parameters may include weather (received from weather services), event information (from public databases), and the like. The event information may include date and time of school closures, holiday schedules, public events (e.g., parades, games, etc.).

At S630, the received terrain map(s), delivery request(s), and optionally the environmental parameters are analyzed to generate a navigation plan. In an embodiment, the navigation plan includes a plurality of segments, where each segment may include an origin and destination. The segment may further include an instruction to arm (or disarm) the PDS of the delivery drone, or a certain subsystem of the PDS. For example, an instruction may include to arm the parachute or airbag of the PDS.

The analysis of the terrain map may determine which areas are civilian populated and which are not; civilian areas that may be populated at times; areas that strictly prohibited for flights, and so on. To determine the navigation plan, the information derived from the terrain map is correlated with the requested delivery time and optionally environmental parameters. For example, if a stadium is vacant and a windy forecast is predicted during a requested delivery time, a segment include the navigation plan would disarm the PDS at this location allowing the drone to crash on the stadium in case of failure.

In certain embodiments, a navigation segment may be identified which can be split into a plurality of subsegments, so that the navigation segment includes a first subsegment in which the PDS is armed, and a second subsegment in which the PDS is disarmed.

At S640, the navigation plan is transmitted to a delivery drone. In an embodiment, the navigation plan including the segments may be displayed on a display of a user operating, for example, the control server. A segment where the PDS is armed may appear in a first color, whereas a segment where the PDS is disarmed may appear in a second color distinct from the first.

In certain embodiments, the user may be able to provide instructions to the control server to override the arming or disarming instructions for one or more segments. In some embodiments, the control server may display in real time, based on telemetry received from the drone the position of the drone on a map, including displaying the navigation segments.

The disclosed embodiments have been discussed with reference to a specific example of a delivery drone, however, it should be apparent that any type of unmanned aerial vehicle may benefit from the teachings herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for dynamically operating a drone safety system of a delivery drone, comprising:
receiving at least one terrain map;

receiving a delivery request, wherein the delivery request includes a destination location and a delivery time for an unmanned aerial vehicle (UAV) including a protection deployment system (PDS);

analyzing the received at least one terrain map and the delivery request to generate a navigation plan, wherein the navigation plan includes a plurality of segments, wherein each of the plurality of segments includes at least source coordinates, destination coordinates, and a plurality of sub-segments, the plurality of sub-segments including at least one first sub-segment in which the PDS is armed and at least one second sub-segment in which the PDS is disarmed;

sending the navigation plan to the UAV for execution of the navigation plan, wherein a failure of the UAV occurs while the UAV is executing the navigation plan in one of the at least one first sub-segment or one of the at least one second sub-segment, wherein the navigation plan, when executed by the UAV, causes the UAV to:

deploy the PDS upon the failure of the UAV when the failure of the UAV occurs in one of the at least one first sub-segment; and avoid deploying the PDS upon the failure of the UAV when the failure of the UAV occurs in one of the at least one second sub-segment.

2. The method of claim 1, further comprising:
receiving environmental parameters, wherein the environmental parameters include at least weather information and events information.

3. The method of claim 2, further comprising:
correlating terrain information from the at least one map with the requested delivery time and environmental parameters to generate the navigation plan.

4. The method of claim 1, wherein the PDS further includes any of: an airbag and a parachute.

5. The method of claim 1, wherein the plurality of segments is defined differently at different delivery times.

6. A non-transitory computer readable medium having stored thereon instructions for causing a processing circuitry to execute a process, the process comprising:
receiving at least one terrain map;
receiving a delivery request, wherein the delivery request includes a destination location and a delivery time for an unmanned aerial vehicle (UAV) including a protection deployment system (PDS);
analyzing the received at least one terrain map and the delivery request to generate a navigation plan, wherein the navigation plan include a plurality of segments, wherein each of the plurality of segments include at least source coordinates, destination coordinates, and a plurality of sub-segments, the plurality of sub-segments including at least one first sub-segment in which the PDS is armed and at least one second sub-segment in which the PDS is disarmed;
sending the navigation plan to the UAV for execution of the navigation plan, wherein a failure of the UAV occurs while the UAV is executing the navigation plan in one of the at least one first sub-segment or one of the at least one second sub-segment, wherein the navigation plan, when executed by the UAV, causes the UAV to:
deploy the PDS upon the failure of the UAV when the failure of the UAV occurs in one of the at least one first sub-segment; and
avoid deploying the PDS upon the failure of the UAV when the failure of the UAV occurs in one of the at least one second sub-segment.

7. A system for dynamically operating a drone safety system of a delivery drone, comprising:
a processing circuitry; and
a memory, the memory containing instructions that, when executed by the processing circuitry, configure the system to:
receive at least one terrain map;
receive a delivery request, wherein the delivery request includes a destination location and a delivery time for an unmanned aerial vehicle (UAV) including a protection deployment system (PDS);
analyze the received at least one terrain map and the delivery request to generate a navigation plan, wherein the navigation plan include a plurality of segments, wherein each of the plurality of segments include at least source coordinates, destination coordinates, and a plurality of sub-segments, the plurality of sub-segments including at least one first sub-segment in which the PDS is armed and at least one second sub-segment in which the PDS is disarmed;
send the navigation plan to the UAV for execution of the navigation plan, wherein a failure of the UAV occurs while the UAV is executing the navigation plan in one of the at least one first sub-segment or one of the at least one second sub-segment, wherein the navigation plan, when executed by the UAV, causes the UAV to:
deploy the PDS upon the failure of the UAV when the failure of the UAV occurs in one of the at least one first sub-segment; and
avoid deploying the PDS upon the failure of the UAV when the failure of the UAV occurs in one of the at least one second sub-segment.

8. The system of claim 7, wherein the system is further configured to:
receive environmental parameters, wherein the environmental parameters include at least weather information and events information.

9. The system of claim 8, wherein the system is further configured to:
correlate terrain information from the at least one map with the requested delivery time and environmental parameters to generate the navigation plan.

10. The system of claim 7, wherein the PDS further includes any of: an airbag and a parachute.

11. The system of claim 7, wherein the plurality of segments is defined differently at different delivery times.

12. The method of claim 1, wherein the PDS includes a plurality of protection devices, wherein the navigation plan includes instructions for determining at least one protection device of the PDS to be armed in each of the at least one first sub-segment.

13. The system of claim 7, wherein the PDS includes a plurality of protection devices, wherein the navigation plan includes instructions for determining at least one protection device of the PDS to be armed in each of the at least one first sub-segment.

* * * * *